(12) United States Patent
Thomson et al.

(10) Patent No.: US 11,868,470 B2
(45) Date of Patent: Jan. 9, 2024

(54) EMBEDDED MALWARE DETECTION USING SPATIAL VOTING AND MACHINE LEARNING

(71) Applicant: Raytheon Company, Waltham, MA (US)

(72) Inventors: Ryan Howard Thomson, Highland Village, TX (US); Ross Mackinnon, Mckinney, TX (US); Brandon Woolley, Murphy, TX (US)

(73) Assignee: RAYTHEON COMPANY, Waltham, MA (US)

(*) Notice: Subject to any disclaimer, the term of this patent is extended or adjusted under 35 U.S.C. 154(b) by 534 days.

(21) Appl. No.: 17/147,367

(22) Filed: Jan. 12, 2021

(65) Prior Publication Data

US 2022/0222341 A1 Jul. 14, 2022

(51) Int. Cl.
*G06F 21/56* (2013.01)
*G06N 5/04* (2023.01)
*G06N 20/00* (2019.01)

(52) U.S. Cl.
CPC .............. *G06F 21/562* (2013.01); *G06N 5/04* (2013.01); *G06N 20/00* (2019.01); *G06F 2221/033* (2013.01)

(58) Field of Classification Search
CPC ..................................................... G06F 21/562
See application file for complete search history.

(56) References Cited

U.S. PATENT DOCUMENTS

| 10,303,875 | B1 | 5/2019 | Saxe et al. | |
| 10,841,333 | B2 | 11/2020 | Levy | |
| 10,937,465 | B2* | 3/2021 | Jaenisch | G11C 5/025 |
| 2019/0311120 | A1* | 10/2019 | Jaenisch | G06F 21/566 |
| 2019/0312908 | A1 | 10/2019 | Jaenisch et al. | |
| 2020/0272731 | A1* | 8/2020 | Jaenisch | G06F 21/554 |

* cited by examiner

*Primary Examiner* — Simon P Kanaan
(74) *Attorney, Agent, or Firm* — LEWIS ROCA ROTHGERBER CHRISTIE LLP (57) ABSTRACT

A system and method for detecting embedded malware from a device including a receiver for receiving embedded binary image; a memory for encoding and storing the received embedded binary image; and one or more processors coupled to the receiver. The method includes extracting statistical features from the encoded embedded binary image; producing gridded data from the statistical features, using SV; inputting the gridded data to a machine learning (ML) trained to detect embedded malware from the gridded data; and determining whether the embedded binary image is benign or malware.

20 Claims, 7 Drawing Sheets

EMBEDDED MALWARE DETECTION USING SPATIAL VOTING AND MACHINE LEARNING

FIELD

The disclosed concept generally relates to malware detection and more particularly to malware detection using spatial voting and machine learning.

BACKGROUND

Electronic components and processors, especially integrated circuit (IC) components, form the foundation of the modern electronic systems. Over the last decade, increasing globalization has resulted in an increase in vulnerabilities within the electronic component supply chain. Threats to these components include those, which may result in the exfiltration of technical information and/or the insertion of malicious content that reduces the authenticity and integrity of the ICs.

Conventional malware detectors (e.g. Norton Anti-Virus™) operate on non-embedded computing devices and generally operate using signatures and heuristics to identify malware. Some other detectors use rules and heuristics to determine whether a file is a malware or not. Such detectors typically rely on prior knowledge of the type of a file to determine whether malicious code has been injected into the file. These methods may result in a large number of false positives, especially when the file has been modified by the user, as a system or development requirement.

Heuristics-based malware detectors apply rules to identify malware. These detectors also have a set numerical value that determines whether the file is suspicious and when the score meets an assigned point, the numerical value is flagged as a threat or malware. Other typical malware detectors accumulate a number of malware samples and compare each malware sample to a list of potential known malware samples (e.g., in a database) to decide whether the potential malware file sample matches a known malware sample, using pattern matching.

Signature-based detectors use virus codes to identify malware, where the malware carries a unique code that is used to identify it. When a software file reaches the computer, the malware scanner collects the code and sends it to a cloud-based database. The database has a vast collection of virus codes. If the file code is found in the list, the database returns with a verdict that the file is malware. The antimalware software then denies the file from the computer and deletes it. If there's a new malware discovered, its code is added to the list.

However, such detectors can be time-consuming and computation-intensive, and may also require frequent updates to a known malware database to determine whether a file on a system is malware.

SUMMARY

The disclosed approach utilizes spatial voting and artificial intelligence (AI)/machine learning (ML) for detecting embedded malware of a device. In some embodiment, the disclosed concept takes in an embedded binary image as its input and determines whether malware is present in the embedded binary image. By being able to detect malware in embedded binary image files, the disclosed approach is able to close fundamental gaps in the supply chain and have a higher level of assurance in the products that utilize the component being tested for embedded malware.

In some embodiment, the disclosed concept is a method for detecting embedded malware from a device. The method includes: receiving an embedded binary image; encoding the received embedded binary image; extracting statistical features from the encoded embedded binary image; producing gridded data from the statistical features, using spatial voting (SV); inputting the gridded data to a machine learning (ML) trained to detect embedded malware from the gridded data; and determining whether the embedded binary image is benign or malware.

In some embodiment, the disclosed is a system for detecting embedded malware from a device. The system includes: a receiver for receiving an embedded binary image; a memory for storing the received embedded binary image; and one or more processors coupled to the receiver and the memory for encoding the received embedded binary image; extracting statistical features from the encoded embedded binary image; producing gridded data from the statistical features, using SV; inputting the gridded data to a ML trained to detect embedded malware from the gridded data; and determining whether the embedded binary image is benign or malware.

In some embodiment, the disclosed is a non-transitory machine-readable medium including instructions stored therein, the instructions executed by one or more processor to perform a method for detecting embedded malware from a device that includes: receiving an embedded binary image; encoding the received embedded binary image; extracting statistical features from the encoded embedded binary image; producing gridded data from the statistical features, using SV; inputting the gridded data to a ML trained to detect embedded malware from the gridded data; and determining whether the embedded binary image is benign or malware.

In some embodiment, the encoding may be binary encoding, where a binary code of the binary encoding represents data in the embedded binary executable file using a two-symbol system. In some embodiment, the statistical features are paired and ordered and a grid size is selected to plot the statistical ordered pairs to generate a list of coordinates for the gridded data. This gridded data maps the ordered pairs of the statistical features to the generated coordinates and represents relevant statistical features of the embedded binary image.

BRIEF DESCRIPTION OF THE DRAWINGS

A more complete appreciation of the disclosure, and many of the attendant features and aspects thereof, will become more readily apparent as the embodiments detailed herein become better understood by reference to the following detailed description when considered in conjunction with the accompanying drawings in which like reference symbols indicate like components, wherein.

DETAILED DESCRIPTION

In some embodiment, the system and method of the present disclosure use a combination of processes/functions to perform malware detection on a binary image embedded in an electronic component. In some embodiment, the system and method of the present disclosure encodes a binary file to extract malware relevant statistical features from it and utilizes spatial voting techniques to create (e.g., two order-dependent) statistical values of the encoded binary image that represent the features within the embedded binary file. In some embodiment, the entire content of a non-volatile memory may be read and malware detected from that content. The system and method of the present disclosure then uses an artificial intelligence (AI)/machine learning (ML) model that has been trained to detect benign versus malware embedded code. This AI/ML model operates on the statistical values produced by spatial voting to determine the existence of malware to detect vulnerabilities, leading to a higher level of assurance in the components.

The utilization of spatial voting in the present approach allows taking large amounts of information, paring the information down to a set of statistical features that are then processed by an AI/ML model to check for malware. This allows the approach to be data agnostic as well as to take large datasets, shrink the data to just its statistical features and detect malware with a high level of confidence. This way, the amount of binary data processed for detection is reduced, while high levels of efficacy are maintained. In contrast to most conventional approaches, the present approach does not rely on heuristics and signatures for the detection, which makes it data agnostic.

As well known in the art, the methods of the disclosure may be executed by one or more processors including memory, databases, input/output circuitries, network interface(s), and various computer peripherals. Various embodiments of the present disclosure can be embedded into software and/or firmware on one or more processors. Embodiments can use Spatial Voting (SV) Techniques to achieve compressive sensing encoding of data streams, sequences, or packets. Moreover, the methods of the disclosure may be stored on a storage medium, such as hard drives, RAMs, flash drives or similar memories, and executed by one or more processors to perform the methods. In some embodiments, Information Theoretic Methods (ITM) are utilized to detect malware in the content of a non-volatile memory (NVM). The ITM techniques includes SV, statistical calculations and SV grid generation.

Figure 1:
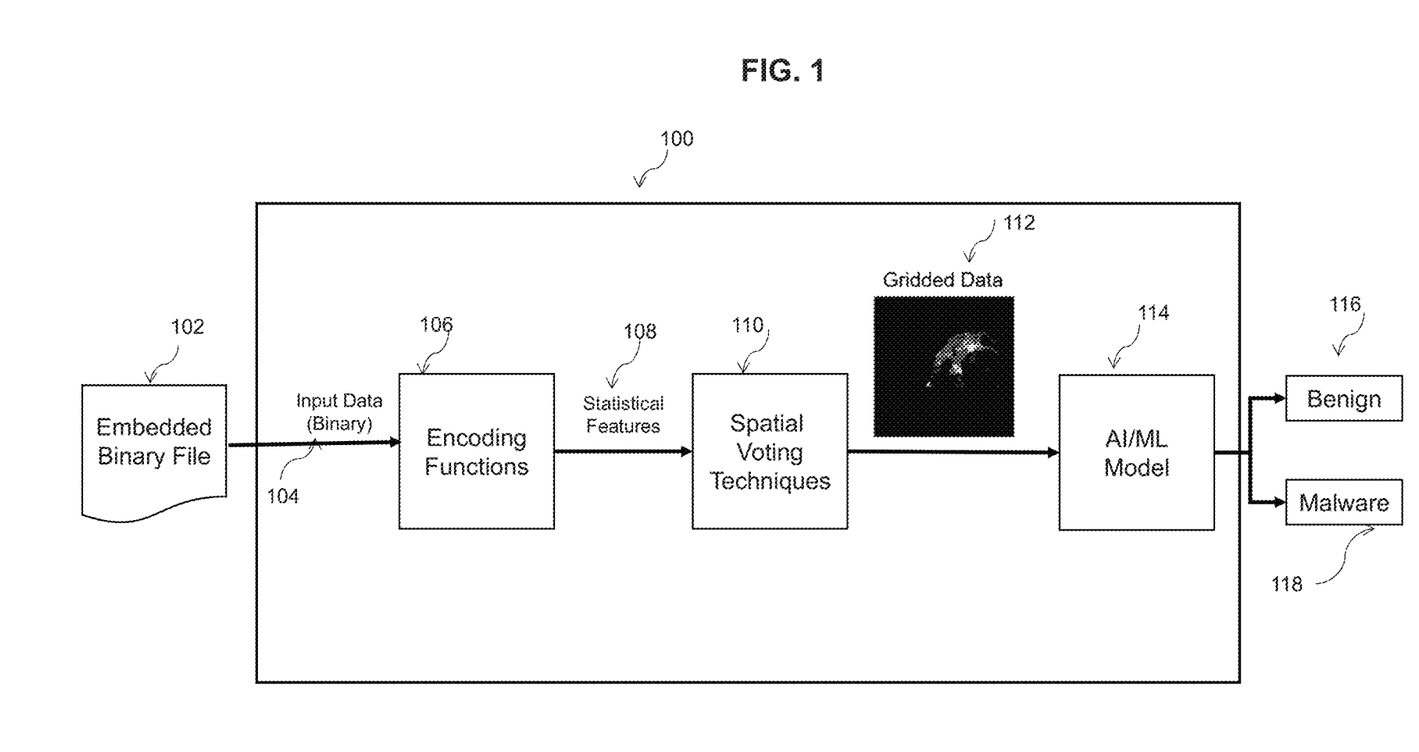
FIG. 1 is an exemplary system and process flow for embedded malware detection, according to the disclosure.

FIG. 1 is an exemplary system and process flow for embedded malware detection, according to some embodiments of the disclosure. As shown, an embedded binary executable file 102, for example, an embedded software-based binary executable file is received (e.g., by a receiver) by the system 100 as binary data 104. In some embodiment, the entire content of a non-volatile memory may be read and malware detected from that content. As mentioned above, system 100 may include one or more processors including various types of memory, input/output circuitries, network interface(s), and various computer peripherals. The embedded binary executable file 102 may be an image chip read from the NVM of a device under test. The binary input data 104 is then encoded into the appropriate format to extract the relevant statistical features of the binary data, by an encoding block 106 (circuitry and/or software). In some embodiments, binary encoding functions are used to encode the binary data. The binary code represents the data using a two-symbol system. The two-symbol system used is "0" and "1" also known as base-2. The binary encoding first formats the binary data into a row and column format to produce a matrix representation of the original binary data. Then each byte within the matrix representation is converted from its base-2 representation to a base-10 representation. For example, a binary string of eight bits can represent any of 256 possible values (0-255) and therefore can represent a wide variety of different items. A more detailed description of the binary coding is provided below with respect to FIG. 2.

Statistical features 108 are extracted from the encoded data. The statistical features 108 are used to reduce the encoded data to the relevant features in the binary image that are used for malware detection, by performing spatial voting (SV) 110 techniques that order statistical feature sets into unique. The result is an SV grid that maps the statistical ordered pairs to the generated grid coordinates, similar to a heat map. In some embodiments, the SV process creates two order dependent statistical feature values of the encoded binary that represent the statistical features extracted from the embedded binary executable. In general, spatial voting process determines two order-dependent statistic values based on the input data. Each of the statistic values (features) is mapped to an axis of an SV grid. The cell to which the statistics map is then identified.

Figure 4A:
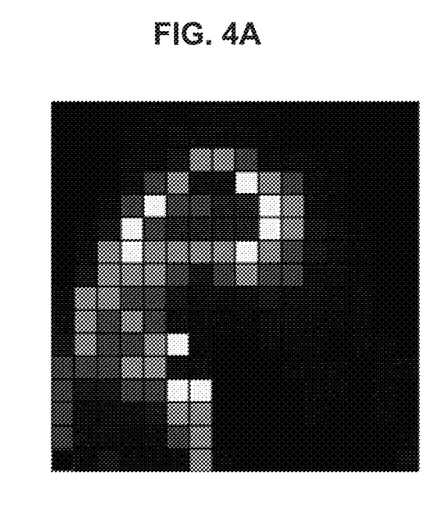
FIGS. 4A and 4B illustrate examples of gridded data, according to the disclosure.
Figure 4B:
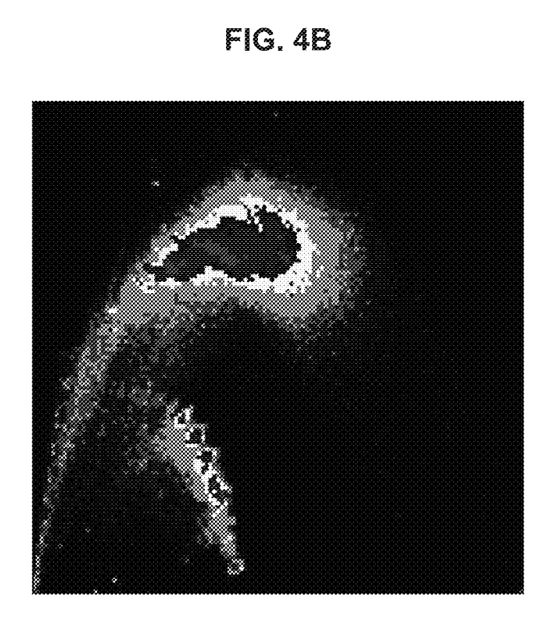

The gridded data 112 (grid of statistical values) is then input to an AI/ML model 114 to determine whether the embedded executable code is benign 116 or malware 118. FIGS. 4A and 4B, explained in more detail below, provide examples of gridded data. The AI/ML model 114 is trained to detect malware in the embedded software-based binary image file for various processing system architectures. The trained AI/ML model 116 inputs the grid of statistical values 112, produced by spatial voting in block 110, to determine the existence of software-based malware inside the software-based embedded binary image file 102. In some embodiments, the binary image can contain an executable image. One skilled in the art would realize that the process and blocks in FIG. 1 may be implemented as electronic circuits, such as one or more integrated circuit (IC) devices, one or more general-purpose or specific-purpose processors with memory and I/O circuits executing software to performed the relevant functions.

Figure 2:
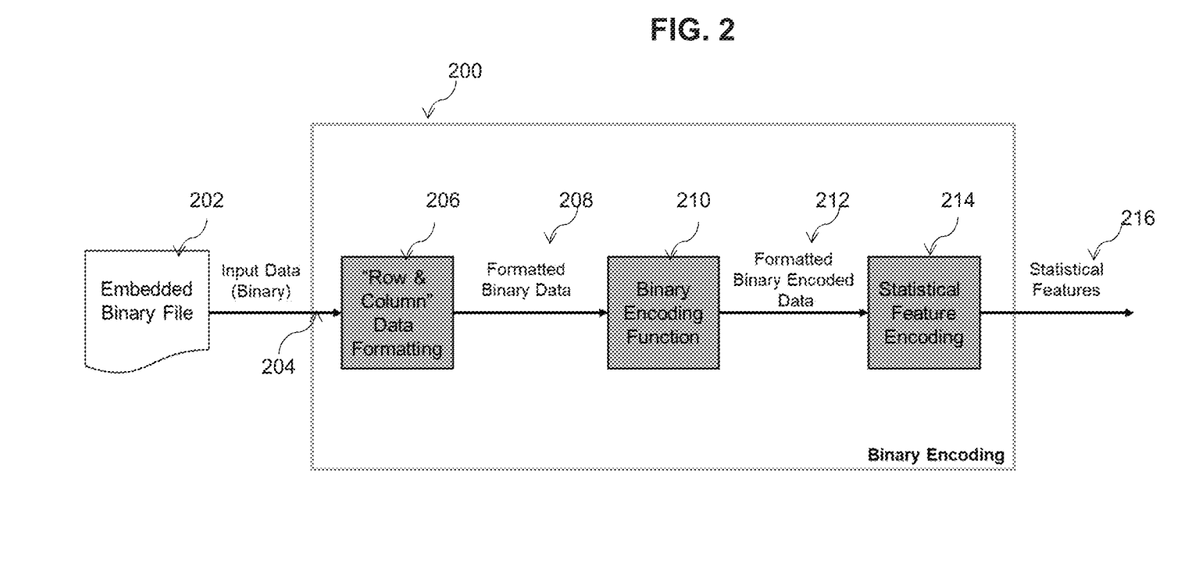
FIG. 2 is an exemplary process flow for binary encoding, according to the disclosure.

FIG. 2 is an exemplary process flow for binary encoding, according to some embodiments of the disclosure. The input embedded binary executable file 202 is structured into a meaningful format in order to extract the relevant statistical features. As depicted, an embedded binary executable file 202, for example, an embedded software-based binary executable file is read by an encoding block 200 (for example encoding block 106 in FIG. 1), as binary data 204. The binary data is then organized or formatted into rows and columns, in block 206. In some embodiments, the total number of columns are determined by the bit architecture of the target system (i.e., the system under test) for the embedded binary file; and the number of rows is calculated by dividing the size of the binary (in bytes) by the number of columns (bytes per row).

In some embodiments, each column represents a single byte of data, and each row represents the size (in bytes) of the total number of machine instructions needed for execution for a particular type of machine/system. The number of columns per row is determined by the bit architecture of the system the input file represents. For example, if the input file is from a 32-bit system architecture there will be 12 columns (bytes) per row. This is because a 32-bit system architecture typically takes 3 32-bit words to get the normal number of system instructions needed for execution, and 96-bits equal's 12-bytes, for example:

[byte_0], [byte_1], [byte_2], . . . , [byte_11]
[byte_0], [byte_1], [byte_2], . . . , [byte_11]
[byte_0], [byte_1], [byte_2], . . . , [byte_11]
   . . . for n rows . . . .
[byte_0], [byte_1], [byte_2], . . . , [byte_11]

If the input file is from a 64-bit system architecture there will be 24 columns (bytes) per row. This is because a 64-bit system architecture typically takes 3 64-bit words to get the normal number of system instructions needed for execution, and 192-bits equal's 24-bytes. Format example:

[byte_0], [byte_1], [byte_2], [byte_3], [byte_4], . . . , [byte_23]
[byte_0], [byte_1], [byte_2], [byte_3], [byte_4], . . . , [byte_23]
[byte_0], [byte_1], [byte_2], [byte_3], [byte_4], . . . , [byte_23]
   . . . for n rows . . . .
[byte_0], [byte_1], [byte_2], [byte_3], [byte_4], . . . , [byte_23]

Referring back to FIG. 2, the formatted binary data 208, organized in rows and columns, is then input to an encoding function 210. The encoding function 210 encodes the formatted binary data 208 into its integer equivalent, for example, a value between 0-255, in order to be encoded into a relevant statistical feature. In some embodiments, the encoding function 210 is a binary encoder function that encodes bytes of binary data from the input file into four different encodings with the expectation that advantages can be found to use a particular type of encoding for malware detection. The four types of encoding are as follows:

0-255 Integer Encoding: Each byte is encoded into its integer representation between 0 and 255.

ASCII Encoding: Each byte is encoded into its ASCII representation, any byte that does not map the 128 characters in the ASCII encoding set is set as a null character.

Extended ASCII Encoding using WIN-1252: Each byte is encoded into its Extended ASCII representation using the WIN-1252, any byte that does not map to a character in the Extended ASCII encoding is set as null.

Hexadecimal Encoding: Each byte is encoded into its Hexadecimal representation between 0x00 and 0xFF.

Referring back to FIG. 2, formatted binary encode data 212 is output from the encoding function 210 and read by a statistical feature encoding 214 to produce the statistical features 216, for example to be read by the spatial voting (SV) 110 in FIG. 1. In some embodiments, the statistical feature encoding 214 performs SV techniques on the formatted binary encoded data 212 to calculate 6 unique statistical features per each row of data in the dataset, for example, RM, RS, SM, SS, TM and TS. The 6 unique statistical features are then separated into 3 main feature types: R-type features, S-type features, and T-type features. Each feature type has a running mean and a running sigma. For example, RM is an R-type feature running mean and RS is an R-type feature running sigma. Each set of encoding features used as (x, y) pairs yields a different but valid view of the same data, with each sensitive to a different aspect of the same data. "R" features tend to group and pull together, "S" features tend to spread out, "T" features tend to congeal data into fewer groups, but sub groups tend to manifest with much more organized structure.

Each feature is now described in more detail with suggested application:

R-type features are recommended when the dynamic variability in data is unknown (typically initial analysis). This can be refined in subsequent analysis. R-type features will tend to group data more than other features.

S-type feature—Tends to spread the data out more. How the encoded data spreads can be important, so things that stay together after spreading are more likely to really be similar. S-type features produce a potentially unbounded space. S-type features tend to spread data along one spatial grid axis more than another. Note, if the occupied cells in the SV spatial grid fall along a 45-degree line, then the 2 chosen stat types are highly correlated and are describing the same aspects of the data. When this occurs, it is generally suggested that one of the compressive encoding features be changed to a different one.

T-type feature—These compressive encoding features are sensitive to all changes and are used to calculate running mean and running sigma exceedances. T-type features can provide improved group spreading over other features types. T-type features tend to spread data along both axes.

To generate these feature sets, calculations are performed in the sequence shown so that they can be calculated in a single pass across the data element where a value derived by an earlier step is used in an antecedent step directly and all calculations are updated within a single loop.

RM can be determined using Equation 1:

$$RM_i = (RM_{i-1} + X_i)/2 \qquad \text{Equation 1}$$

where, $X_i$ is the ith input value for i=1, 2 . . . n
RS can be determined using equation 2:

$$RS_i = \left(RS_{i-1} + \sqrt{\frac{(X_i - RM_i)^2}{2}}\right) \bigg/ 2 \qquad \text{Equation 2}$$

SM can be determined using equation 3:

$$SM_i = \Sigma X_i / n \qquad \text{Equation 3}$$

SS can be determined using equation 4:

$$SS_i = +\sqrt{(SS_{i-1} + (X_i - SM_i)^2)/(n-1)} \qquad \text{Equation 4}$$

TM can be determined using Equation 5:

$$TM_i = (TM_{i-1} + SM_{i-1})/2 \qquad \text{Equation 5}$$

TS can be determined using equation 6:

$$TS_i = \left(TS_{i-1} + \sqrt{\frac{(X_i - TM_i)^2}{2}}\right) \bigg/ 2 \qquad \text{Equation 6}$$

One skilled in the art would realize that the process and blocks in FIG. 2 may be implemented as electronic circuits, such as one or more integrated circuit (IC) devices, one or more general-purpose or specific-purpose processors with memory and I/O circuits executing firmware and software to performed the relevant functions.

Figure 3:
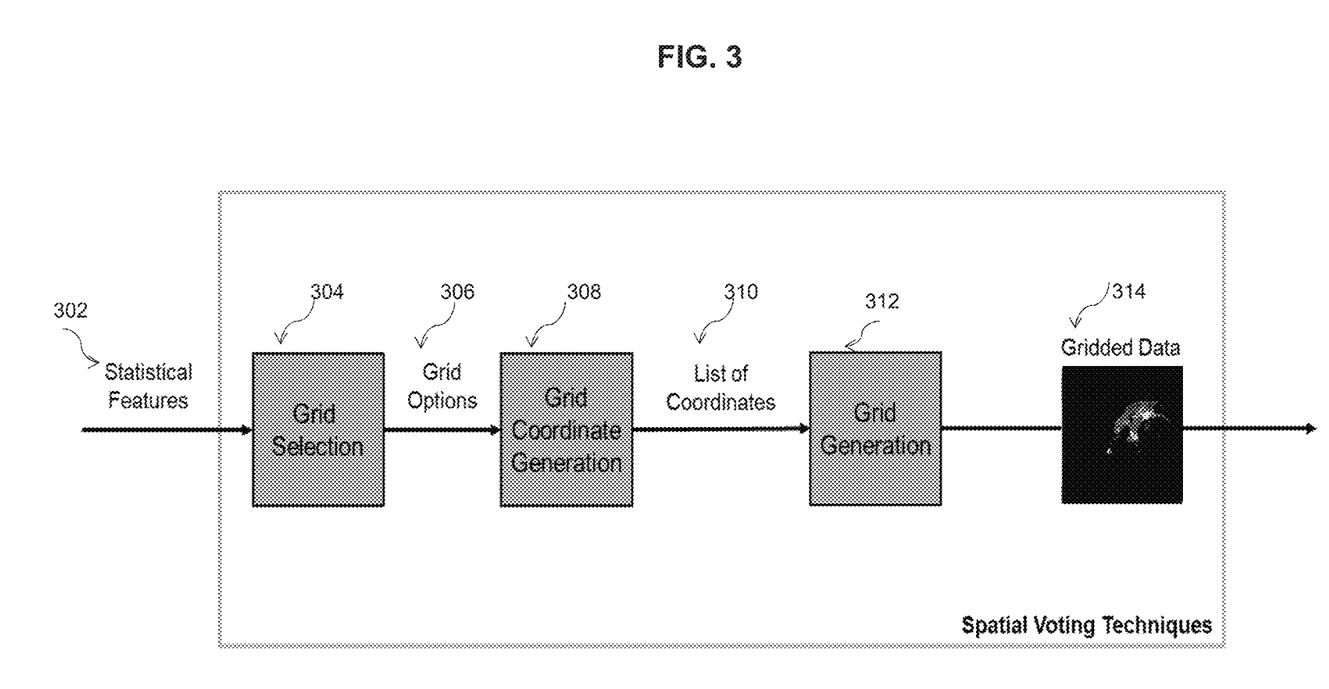
FIG. 3 is an exemplary process flow for spatial voting, according to the disclosure.

FIG. 3 is an exemplary process flow for spatial voting (SV), according to some embodiments of the disclosure. The SV techniques are used to reduce the binary data to the relevant features in the binary image that are used for malware detection. These SV techniques produce SV grids, which provide a pictorial representation (like a heat map) of the relevant features within a binary image. These SV grids can then be used as an input into the AI/ML model. As shown in FIG. 3, the statistical features 302 (e.g., statistical features 108 in FIG. 1) are input to a grid selection 304. The grid selection 304 calculates an optimal grid of the statistical features, based on the entropy and dispersion they create. For example, nine unique grid combinations (i.e. RM/RS or TM/RS) can be generated by the given statistical features (x-axis, y-axis).

In some embodiments, there are nine (9) unique grid combinations generated by statistical feature encoding 214 in FIG. 2 or an ITM. These combinations are determined by the unique statistic combinations that can be created without pairing two statistic features of the same type together. This means a Running Mean Stat and a Running Mean Stat cannot be paired together. Running Mean Stats are the X-axis and the Running Sigma Stats are the Y-axis. As a result, the following unique grid combinations can be created:

1. RM/RS
2. RM/SS
3. RM/TS
4. SM/RS
5. SM/SS
6. SM/TS
7. TM/RS
8. TM/SS
9. TM/TS

Gridding the running mean and running sigma stats together helps detect shifts in location with the mean and shifts in the scale with the standard deviation in the same grid.

A Grid coordinate generation 308 selects the appropriate grid size to plot the statistical ordered pairs (i.e. RM/SS), using grid options 306 and generates a list of coordinates 310. After the stats have been calculated for each row of encoded data, the statistical feature encoding 214 in FIG. 2 or an ITM can then generate the grid coordinate sets for each unique grid combination and its various sizes. For example, the grid coordinate generation 308 can generate the following grid sizes:

16×16
32×32
64×64
128×128
256×256
512×512
1024×1024
2048×2048

There is a tradeoff when selecting which grid size to use to accurately represent the binary data that was processed by the statistical feature encoding or the SV techniques. As the grid size increases, the precision of how the grid coordinates are plotted into the grid increases. However, if there is not sufficient data from the binary input file to plot a meaningful amount of grid coordinates, the merit of the calculated stats decreases. This can be seen inside a grid where many of grid cells will only have a single grid coordinate mapped to that cell and no meaningful clusters of generated grid coordinates are found inside the grid (i.e., lots of 1's and 0's).

To avoid this, a smaller grid size that shows meaningful clusters and higher grid cell values would be the better option (grid options 306) to represent the data. The grid size is selected (using the grid options 306) such that it is large enough so that the input statistical features do not lose precision, and the generated grid coordinates do not flood the grid as one big cluster. In order to choose the correct grid size(s) to represent the binary input data, the size of the binary input file is also considered, as well as the desired amount of precision in the grid.

A grid generation 312 takes the list of coordinates 310 and generates gridded data 314 to be input to an AI/ML. The gridded data 314 is a spatial voting grid (similar to a heat map) that maps the statistical ordered pairs to the generated coordinates 310. The statistical feature types are paired by their type (e.g., the 9 unique grid/feature combinations, RM/RS, RM/SS, etc.), for each unique grid/feature combination. For example, in the RM/RS combination, there is a list of RM statistical features that has been calculated on the formatted binary encoded data (calculated on each row of binary encoded data) and a list of RS statistical features that has been calculated on the same formatted binary encoded data (calculated on each row of that same binary encoded data). Therefore, each row of the binary encoded data has RM and RS statistical features that have been calculated. The RM and RS statistical features of that row are then paired together for each row of binary encoded data. As a result, a list of ordered-pairs (RM-value, RS-value) that can now be translated to grid coordinates is generated. The spatial voting grid represents the relevant statistical features of the binary image file. In some embodiment, once all the unique grid coordinate sets have been generated, the statistical feature encoding can then take each grid coordinate set and plot it onto a grid of the correct size.

The statistical feature encoding SV techniques generates the grid for each unique combination by reading each grid coordinate set and plotting each into the current grid. When plotting the grid coordinate, the statistical feature encoding increments the current value of the grid cell at that grid coordinate by one. The grid generation is completed when all grid coordinates in the current grid coordinate set have been plotted into the grid. In some embodiments, there are seventy-two (72) unique grids that can be created (i.e., nine unique grid combinations, for each of the eight grid sizes). A more detailed description of special voting techniques is provided in a co-owned Publication Nos. US 2019/0312908, entitled "Cyber Chaff Using Spatial Voting; and US 2020/0272731, entitled "Anomaly Detection with Adaptive Auto Grouping," the entire contents of which is hereby expressly incorporated by reference.

FIGS. 4A and 4B illustrate examples of gridded data, according to some embodiments of the disclosure. FIG. 4A, is an example of a 16×16 SV grid with the statistical features of an embedded binary mapped inside the grid. Similarly, FIG. 4B, is an example of a 128×128 SV grid with the statistical features of the same embedded binary used to create the SV grid in FIG. 4A mapped inside of it. Both FIGS. 4A and 4B depict an embedded binary file that has been reduced to an SV grid that represent the relevant statistical features used for malware detection.

Figure 5:
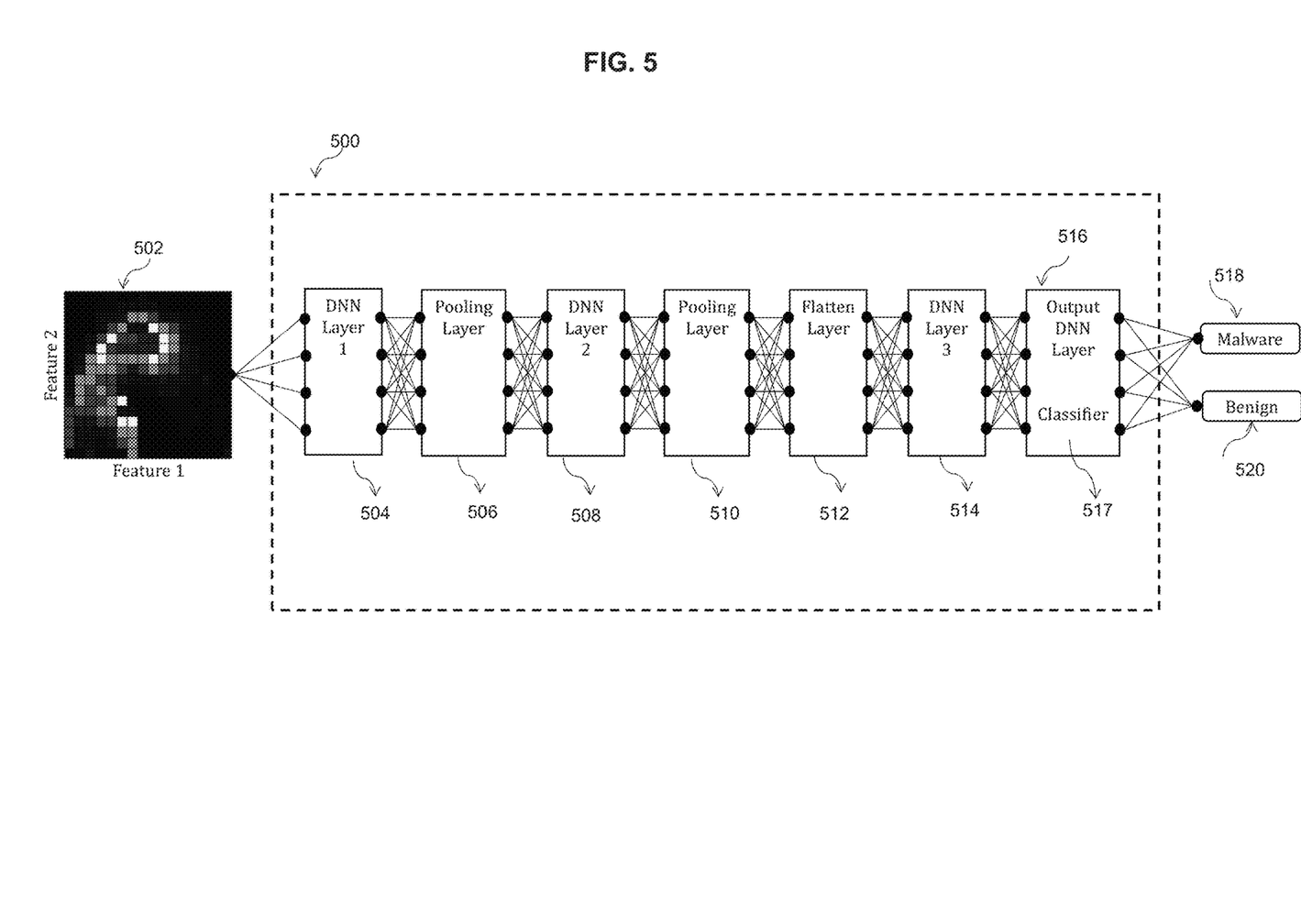
FIG. 5 is an exemplary block diagram of a machine learning, according to the disclosure.

FIG. 5 is an exemplary block diagram of a machine learning architecture 500, according to some embodiments of the disclosure. The AI/ML models created are Deep Neural Networks (DNNs) that use multiple layers to achieve malware detection in embedded binary files, as shown by DNN layer 1 (504), DNN layer 2 (508), DNN layer 3 (514), and Output DNN layer (516). The models use a grid 502

(e.g., the binary's SV grid) with two statistical features as its x-y axis. Gird 502 holds the extracted relevant features, as the input parameters to the model and make a binary predication of malware 518 or benign 520. This model has already gone through the training process to optimize the weights inside of the DNN layers for a particular machine (device under test) architecture and grid size, but can be used with any of the 9 grid types, described above.

Grid 502 is passed through each layer of the model until it reaches the Output DNN layer (516) where it can then be run through a classifier 517 (e.g., the Softmax™ classifier) to decide if grid 502 represents a malware 518 or benign 520 embedded binary file. The Pooling Layers 506 and 510 filter the outputs of DNN layers 1 and 2 to reduce the computational load inside the model and prevent over-fitting. The Flatten Layer 512 converts the output from pooling layer 510 to a 1-dimensional output vector.

In some embodiment, two models are created—one for 32-bit machine architectures and the other one for 64-bit machine architectures. Although, one skilled in the art would recognize that the present disclosure also applies to any-bit machine architecture. There are already established image anomaly detectors that use a sequential model to accurately identify anomalies, or the most anomalous image, in an image data set such as the well-known MINST™ image database of handwritten numbers. By using a variation of the image anomaly detection algorithms and a sequential model tailored for SV grids of n×n size, anomaly on SV grids are detected to identify which binaries are anomalous (malicious) and which are not (benign). Furthermore, if anomaly detection using SV grids is performed, the accuracy of the anomaly detection increases if the input SV grids can be sexpartite by the machine bit architecture (32-bit or 64-bit) of the binary it represents.

In some embodiment, the two models mentioned above (Trained AI/ML model for 32-bit and 64-bit machine architectures) are sequential AI/ML models that have been trained on only benign grids (unsupervised learning), thus the anomalies the model detects would be malicious grids. After the model is trained, it is then executed on a mixed data set of benign and malicious grids, a data set of only malicious grids, and the original benign training data set and produces the accuracy of the model at identifying anomalous (malicious) grids for each data set, as shown and describe with respect to FIG. 6.

Figure 6:
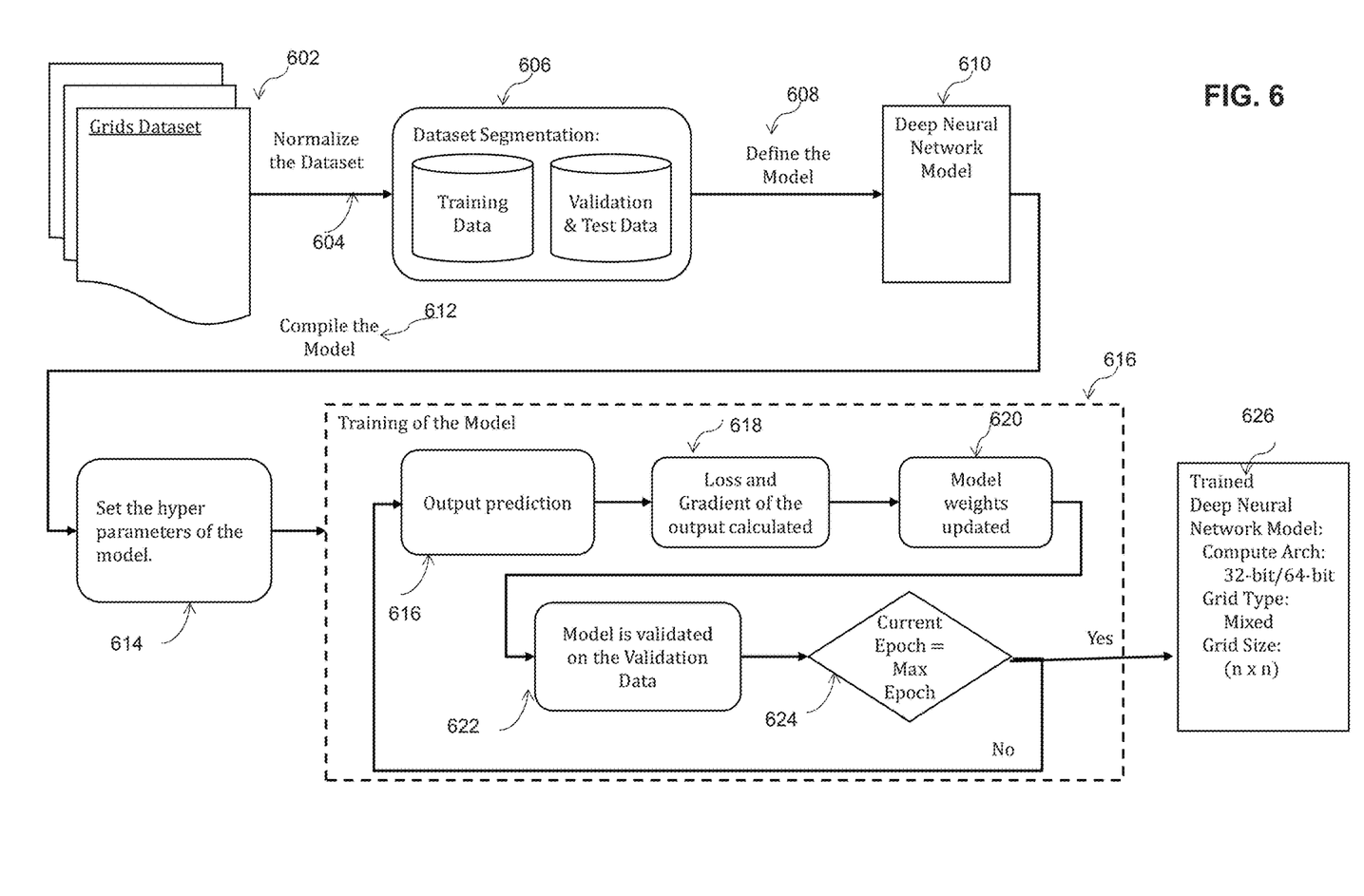
FIG. 6 is an exemplary process flow for malware detection by a machine learning technique, according to the disclosure.

FIG. 6 is an exemplary process flow for malware detection by a machine learning technique, according to some embodiments of the disclosure. As depicted, a grid dataset 602 to be used to train, validate, and test the AI/ML model is determined. The architecture of the device under test (e.g., 32 or 64 bit) and the grid size (n×n) of the grid dataset is selected. The grid dataset includes all grid types meeting the above constraints. The dataset 602 is then normalized to produce normalized data 604. For example, for each SV grid in the dataset, all grid cell values are normalized to a value between 0 and 1, where the normalized value of 1 is equal to the max grid cell value of the current grid. The grid cell of (0,0) in every SV grid is set to 0 because this cell represents empty memory in the binary file, and its value will skew the detection results.

Data segmentation 604 is then performed on the normalized dataset 604. In some embodiments, the data segmentation includes: training Data, for example, 60% of the normalized grid dataset randomly selected; and validation & test data, for example, the remaining 40% of the normalized grid dataset not selected as training data. A sequential model, its initializer, input/hidden/output layers, and activation functions 608 are then defined and input to a deep neural network model 610. The defined model with the selected optimizer and loss function are then complied 612 by the DNN. In block 614, the hyper parameters for the model's training as set as follow:
  Batch Size (b)—number of grids from the training dataset to give the model at once, and
  Max Epoch (e)—the max number of passes the entire training dataset will pass through the model during training.

The model is then trained in block 616. The training data passes through the model to obtain an output prediction, in block 618. The loss and gradient are calculated on the output predictions from the training data, in block 618 and the weights of the model are updated by the neural network, based on the loss and gradient values in block 620. The model is then simultaneously validated with the validation data to prevent the over-fitting (classification bias towards the test data), in block 622. The model training process from blocks 616 to 624 is then repeated until a current epoch reaches the maximum epoch, in block 624, until all of the grids considered.

A single epoch is a full cycle of block 616 which includes a single pass of all the grids in the training dataset through the model. The max epoch is the number of times the full cycle of block 616 is executed, which is determined by continuously testing the training process of the model to minimize the loss value calculated on the output prediction of the model during each epoch. This results in a trained AI/ML model 626 that can detect malware vs. benign from SV grids of embedded binary executable for a selected computer architecture and grid size (n×n), of any grid type.

Figure 7:
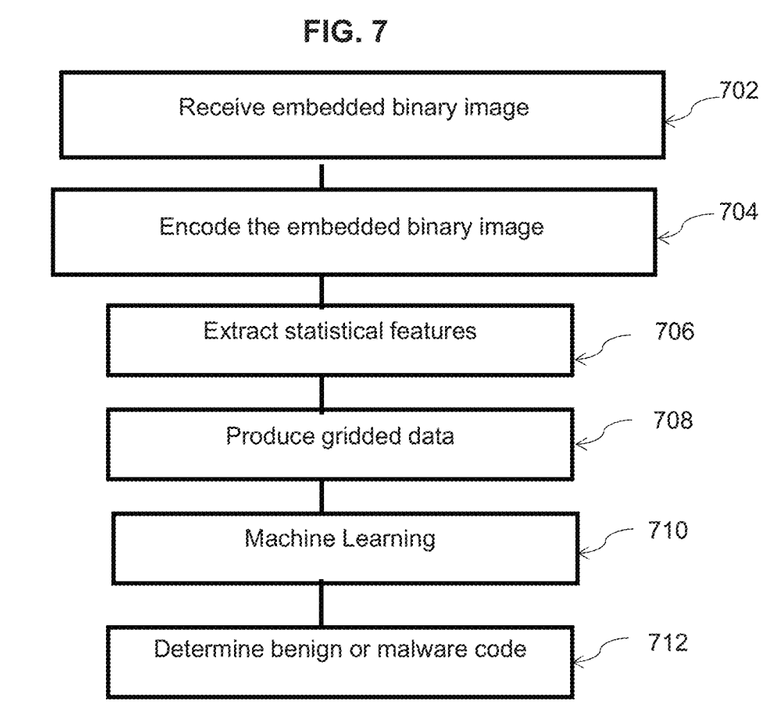
FIG. 7 is an exemplary process flow for malware detection using spatial voting and machine learning, according to the disclosure.

FIG. 7 is an exemplary process flow for malware detection using spatial voting and machine learning, according to some embodiments of the disclosure. As emphasized above, one skilled in the art would realize that the processes in FIG. 7 may be implemented as electronic circuits, one or more general-purpose or specific-purpose processors with memory and I/O circuits executing firmware and software to performed the relevant functions. As shown in block 702, an embedded binary image is received. This file may be read from a device (e.g., an NVM of the device), wherein the binary image is embedded. In block 704, the received embedded binary image is encoded. In some embodiments, the encoding is a binary encoding resulting in a reduced amount of data to be analyzed.

In block 706, statistical features are extracted from the encoded embedded binary image. In some embodiments, binary encoding functions are used to encode the binary data. The binary code represents the data using a two-symbol system. The two-symbol system used is "0" and "1". In block 708, gridded data is then produced from the statistical features, using spatial voting (SV). The gridded data in then to a machine learning (ML) that is trained to detect embedded malware from the gridded data, in block 710. In block 712, the ML determines whether the embedded binary executable code is benign or malware and outputs the results, for example, for display on the display device.

It will be recognized by those skilled in the art that various modifications may be made to the illustrated and other embodiments of the disclosure described above, without departing from the broad scope thereof. It will be understood therefore that the disclosure is not limited to the particular embodiments or arrangements disclosed, but is rather intended to cover any changes, adaptations or modifications which are within the scope and spirit of the disclosure as defined by the appended claims and drawings.

What is claimed is:

1. A method for detecting embedded malware from a device, the method comprising:
   receiving an embedded binary image;
   encoding the received embedded binary image;
   extracting statistical features from the encoded embedded binary image;
   producing gridded data from the statistical features, using spatial voting (SV);
   inputting the gridded data to a machine learning (ML) trained to detect embedded malware from the gridded data; and
   determining whether the embedded binary image is benign or malware.

2. The method of claim 1, wherein the encoding is a binary encoding.

3. The method of claim 2, wherein a binary code of the binary encoding represents data in the embedded binary executable file using a two-symbol system.

4. The method of claim 1, further comprising pairing and ordering the statistical features.

5. The method of claim 4, further comprising selecting a grid size to plot the statistical ordered pairs to generate a list of coordinates for the gridded data.

6. The method of claim 5, wherein the gridded data maps the ordered pairs of the statistical features to the generated coordinates.

7. The method of claim 5, wherein the coordinates for the gridded data are generated for each unique grid combination.

8. The method of claim 1, wherein the encoding further comprises formatting the received embedded binary image into rows and columns; and performing SV on the formatted embedded binary image to calculate unique statistical features per each row of data.

9. The method of claim 1, wherein the gridded data represents relevant statistical features of the embedded binary image.

10. The method of claim 1, wherein the AI/ML utilizes dataset normalization and segmentation for training.

11. A system for detecting embedded malware from a device comprising:
    a receiver for receiving an embedded binary image;
    a memory for storing the received embedded binary image; and
    one or more processors coupled to the receiver and the memory for
      encoding the received embedded binary image;
      extracting statistical features from the encoded embedded binary image;
      producing gridded data from the statistical features, using spatial voting (SV);
      inputting the gridded data to a machine learning (ML) trained to detect embedded malware from the gridded data; and
      determining whether the embedded binary image is benign or malware.

12. The system of claim 11, wherein the encoding is a binary encoding and a binary code of the binary encoding represents data in the embedded binary image using a two-symbol system.

13. The system of claim 11, wherein the one or more processors pair and order the statistical features, and select a grid size to plot the statistical ordered pairs to generate a list of coordinates for the gridded data.

14. The system of claim 13, wherein the gridded data maps the ordered pairs of the statistical to the generated coordinates and wherein the coordinates for the gridded data are generated for each unique grid combination.

15. The system of claim 11, wherein the encoding further comprises formatting the received embedded binary executable code into rows and columns; and performing SV on the formatted embedded binary image to calculate unique statistical features per each row of data.

16. The system of claim 11, wherein the AI/ML utilizes dataset normalization and segmentation for training.

17. A non-transitory machine-readable medium including instructions stored therein, the instructions executed by one or more processor to perform a method for detecting embedded malware from a device, the method comprising:
    receiving an embedded binary executable code;
    encoding the received embedded binary image;
    extracting statistical features from the encoded embedded binary image;
    producing gridded data from the statistical features, using spatial voting (SV);
    inputting the gridded data to a machine learning (ML) trained to detect embedded malware from the gridded data; and
    determining whether the embedded binary image is benign or malware.

18. The non-transitory machine-readable medium of claim 17, wherein the encoding is a binary encoding and a binary code of the binary encoding represents data in the embedded binary image file using a two-symbol system.

19. The non-transitory machine-readable medium of claim 17, wherein the encoding further comprises formatting the received embedded binary image into rows and columns; and performing SV on the formatted embedded binary image to calculate unique statistical features per each row of data.

20. The non-transitory machine-readable medium of claim 17, wherein the gridded data represents relevant statistical features of the embedded binary image.

* * * * *